(12) United States Patent
Kunnumpurath

(10) Patent No.: US 9,974,285 B2
(45) Date of Patent: May 22, 2018

(54) SELF-DISPENSING FEEDER FOR POULTRY AND SMALL ANIMALS

(71) Applicant: Francis J. Kunnumpurath, Lafayette, NY (US)

(72) Inventor: Francis J. Kunnumpurath, Lafayette, NY (US)

( * ) Notice: Subject to any disclaimer, the term of this patent is extended or adjusted under 35 U.S.C. 154(b) by 154 days.

(21) Appl. No.: 15/245,608

(22) Filed: Aug. 24, 2016

(65) Prior Publication Data

US 2018/0055019 A1 Mar. 1, 2018

(51) Int. Cl.
*A01K 5/02* (2006.01)
*A01K 5/00* (2006.01)
*A01K 39/012* (2006.01)

(52) U.S. Cl.
CPC .......... *A01K 39/012* (2013.01); *A01K 5/0233* (2013.01)

(58) Field of Classification Search
CPC .......... A01K 5/00; A01K 5/01; A01K 5/0114; A01K 5/0233; A01K 5/0225; A01K 5/0241; A01K 39/01; A01K 39/012; A01K 39/0125; A01K 39/014; A01K 39/00; A01K 5/0275; A01K 5/0291
See application file for complete search history.

(56) References Cited

U.S. PATENT DOCUMENTS

| | | | |
|---|---|---|---|
| 3,034,480 A | 5/1962 | French | |
| 3,677,230 A | 7/1972 | Braden | |
| 3,730,142 A | 5/1973 | Kahrs et al. | |
| 3,780,701 A | 12/1973 | Wentworth, Sr. | |
| 4,729,344 A * | 3/1988 | Winkel | A01K 5/0241 119/53.5 |
| 4,945,859 A | 8/1990 | Churchwell | |
| 5,085,173 A | 2/1992 | Powers | |
| 5,105,766 A * | 4/1992 | Montgomery | A01K 5/0241 119/51.01 |
| 5,333,572 A * | 8/1994 | Nutt | A01K 5/02 119/57.91 |
| 5,479,879 A | 1/1996 | Biek | |
| 5,606,934 A * | 3/1997 | Brisby | A01K 5/0216 119/51.5 |
| 6,691,640 B1 | 2/2004 | Huckabee | |
| 7,404,376 B2 * | 7/2008 | Hernandez | A01K 5/0225 119/51.13 |
| 8,833,303 B1 * | 9/2014 | Linder | A01K 5/0225 119/57.91 |
| D735,420 S | 7/2015 | Plant | |
| 2016/0324127 A1 * | 11/2016 | Brunnberg | A01K 5/0233 |

* cited by examiner

*Primary Examiner* — Trinh T Nguyen
(74) *Attorney, Agent, or Firm* — Bernhard P. Molldrem, Jr.

(57) ABSTRACT

Self-dispensing poultry and small animal feeder dispenses feed from a hopper into a catch dish on demand by action of the bird pecking at the feed in the catch dish or small animal feeding at the catch dish. Interchangeable regulating disks have respective different size center apertures, and a groove seating a cross-bar of a trigger rod on which the catch dish is supported. A spade or paddle at the upper end of the trigger rod moves when the trigger rod wiggles or shifts, and this causes feed to fall through the regulator disk center aperture to replenish the feed in the catch dish.

4 Claims, 3 Drawing Sheets

SELF-DISPENSING FEEDER FOR POULTRY AND SMALL ANIMALS

BACKGROUND OF THE INVENTION

This invention relates in general to bird feeders and animal feeders, and is more particularly directed to demand feeders for agricultural birds, e.g., fowl such as chickens, ducks, turkeys, peafowl, or many other exotic or native birds, or small animals like cats and rabbits.

The invention is more particularly concerned with a feeder that dispenses feed on demand from a raised hopper onto a feed tray or catch dish that is suspended beneath the hopper, where the dispensing occurs by action of the bird or birds feeding, i.e., by action of the birds pecking and grabbing at food on the feed tray.

It is a significant object of the invention to create a bird feeder that is simple, easy to use, refill, and clean, and which allows for choice of a wide variety of feed types, from small grain, such as millet seed or mash, to larger particles such as pellets, corn, or dog food.

The bird feeder provides on-demand gravity feed and engages the birds in pecking and grabbing activities which helps stimulate normal, healthy behavior. The on-demand feeder also reduces over-feeding and eliminates food waste, dispensing feed only when needed.

SUMMARY OF THE INVENTION

In a practical embodiment of the invention, a hopper in the form of a 3- to 5-gallon plastic (or steel) pail is supported on a pail holder above the floor surface where the birds can feed, or alternatively the pail is suspended from a hanger at a level elevated above the floor surface. A feeder funnel has an upper conic part and a lower tubular dispensing tube. In the described embodiment the funnel cone fits snugly against the inside of the pail, and the dispensing nose protrudes down through a four-inch center opening cut in the base of the pail. At or near the junction of the apex of the funnel cone and the dispensing tube, there is an annular ridge that can support an interchangeable metering disk (or metering plate) or regulator disk. The bird feeder is supplied with several metering disks, each with a center dispensing aperture, selected from a variety of aperture sizes. Preferably there can be four to six metering disks with an opening that gradually goes from small to large from one metering disk to the next. The disk is selected to match the type of feed that is to be dispensed.

A trigger rod or trigger bar has a paddle or spade affixed at its upper end and a cross bar that rests in a transverse groove on the regulator disk, which serves to keep the trigger rod properly situated at the center of the aperture. The trigger bar or rod protrudes down through the dispensing tube of the feed funnel, and a feed dish or catch dish slides onto the trigger rod so the dish can be suspended at an optimal level above the floor surface, and a simple spring lock can hold the dish in place.

Initially, a small amount of feed is placed into the feed dish, to stimulate the bird or birds to peck at the feed dish. This causes the dish to move and thus jiggles the trigger rod. The spade at the upper end of the trigger rod disturbs the seeds or other particles that surround it, and some particles fall through the aperture in the regulator disk and onto the catch dish or feed dish.

The on-demand feeder is easy to set up, requiring no tools to assemble, and the bucket type of hopper keeps the feed away from rain, wind, mice or other nuisance animals.

This arrangement creates a highly reliable, on-demand gravity feeder engages the birds and small animals in pecking and grabbing interaction with the catch dish, and thus reduces boredom and aggressive behavior. The on-demand gravity feeder keeps the food secure. The birds quickly learn how to use the bird feeder. If the birds are hungry, they can eat more simply by pecking to demand more. Control over the release of the feed reduces over-eating and waste. Any type of feed can be dispensed, requiring only selection of the regulator disk with the appropriate aperture. Examples of feeds that can be dispensed include pellets, crumble, mash fish feed, rabbit feed, cat feed, dog feed, or grains such as corn, cracked corn or wheat, oats, milo, millet, safflower seed, peas, vetch, barley, buckwheat, canary seed, or flax.

According to an aspect of the invention, a self-dispensing poultry feeder is adapted for being suspended or supported above a floor surface to permit one or more birds to feed from a catch dish that is suspended above the floor surface and into which bird feed particles are permitted to fall as a result of the one or more birds feeding from the catch dish. The poultry feeder has a hopper suspended or supported at an elevated position above the floor surface and is adapted to hold a fill of particles of feed. The hopper has a generally conic feed funnel and the feed funnel has a dispensing tube at a lower apex end thereof and has an open lower end and a ledge at an upper end thereof at the apex of the cone. A metering plate i.e., disk, is supported on the ledge. A transverse slot or groove extends radially across the upper side of the regulator disk on either side of said central aperture.

The trigger bar extends downward through the central aperture of metering plate and continues down through the dispensing tube and out the lower end of the dispensing tube. A cross bar extends horizontally and rests on the regulator disk or metering plate and is seated in the transverse groove or slot. The paddle or spade is affixed onto the trigger bar above the metering plate and extends upward above the cross bar. The spade is configured so as to bear against the feed particles within said feed funnel and to disturb them when the trigger bar moves.

The catch dish is held and positioned on the trigger bar at a desired height above the floor surface and beneath the hopper.

The catch dish is constructed so as to be slidable along the trigger rod, and a dish lock that can slide up or down the trigger rod so that its position above the floor surface can be easily adjusted. The slide lock retains the catch dish at the selected position on the trigger rod above the floor surface and beneath the hopper.

Preferably, there are a plurality of metering plates or regulator disks, each with a respective center aperture, with the center apertures of the metering plates being of different respective diameters. These are selected according to the grain or particle size of the feed to be dispensed. The user can also make a metering plate by simply drilling a hole on a two-inch diameter metal or plastic disk.

In a preferred arrangement, the catch dish has a center tube with an axial bore that the trigger bar penetrates. The catch dish may also have a number of tabs or petals extending radially out from its rim, making it easier for birds and animals to grab.

The above and many other objects, features, and advantages of this invention will become apparent from the ensuing detailed description of a preferred embodiment, which should be read in connection with the accompanying Drawing.

DETAILED DESCRIPTION OF THE PREFERRED EMBODIMENT

Figure 1:
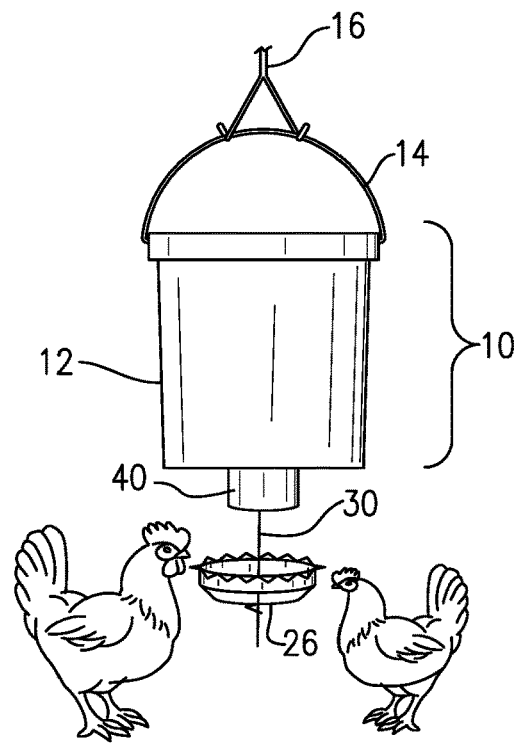
FIG. 1 is a perspective view of a bird feeder according to one preferred embodiment of the present invention.
Figure 2:
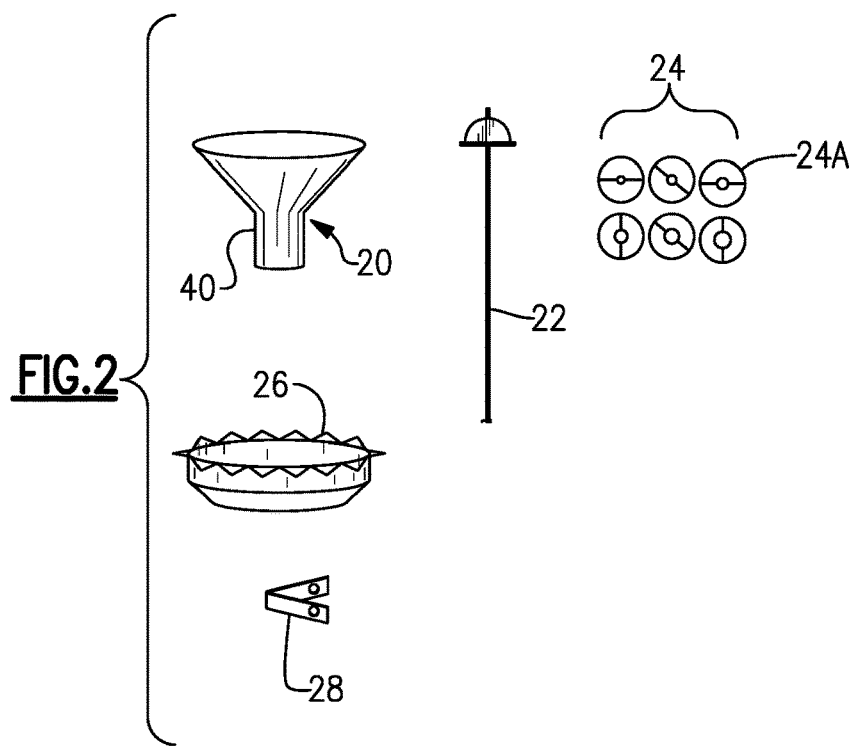
FIG. 2 is an assembly view showing the parts of the bird feeder of this embodiment.
Figure 3:
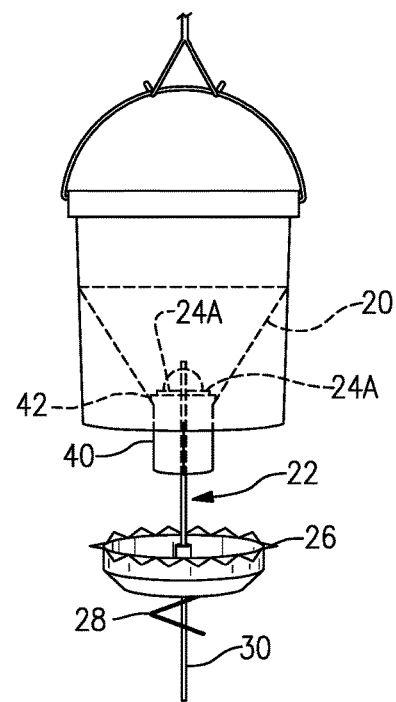
FIG. 3 is a perspective view showing the components of the feeder of this embodiment as assembled.

With reference now to the Drawing, and initially to FIGS. 1 to 3, a bird feed dispenser 10 according to one embodiment of the invention has a hopper in the form of a ten-gallon pail 12 here with a bail handle 14, and here showing a hanger support 16 for hanging the round pail 12 from overhead, e.g., from a rope or chain attached to the hanger support 16. Alternatively, the pail 12 may be supported above the floor surface on a feed pail stand (not shown) or can be mounted on a wall bracket or otherwise supported on vertical surface. The components of the bird feed dispenser 10 are shown individually in FIG. 2. A feeder funnel 20 has a conic upper portion 21 with a diameter configured to fit snugly against the inside of the generally cylindrical side wall of the pail 12. A generally cylindrical lower dispensing tube 40 extends down from the apex of the conic portion 21, and is designed to protrude through an opening of about four inches in diameter at the bottom center of the pail 12. A trigger rod or trigger bar 22, shown in more detail in other views, has a generally vertical down-rod portion 30 and is intended to be supported on a selected one of an assortment of regulator disks 24, and to extend downward through the dispensing tube 40 of the feed funnel 20, with a catch dish or tray 26 being supported at a selected position along the rod portion 30. A slide lock 28, formed as a V-shaped spring is employed to retain the catch dish 26 at the desired position on the rod portion 30. An example of the catch dish is shown in more detail in FIGS. 7 and 8.

Figure 4:
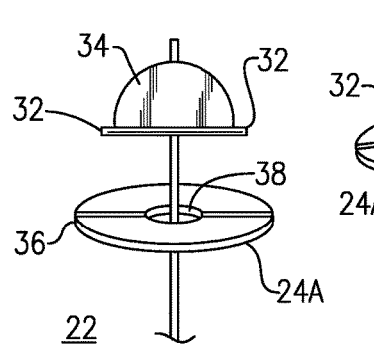
FIG. 4. is a perspective view of the trigger bar and regulator disk of this embodiment.
Figure 5:
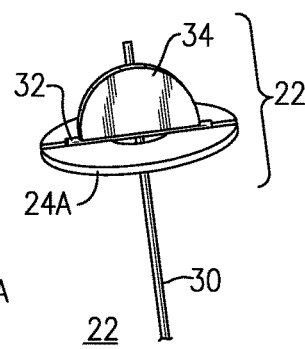
FIG. 5 is another perspective view thereof.
Figure 6:
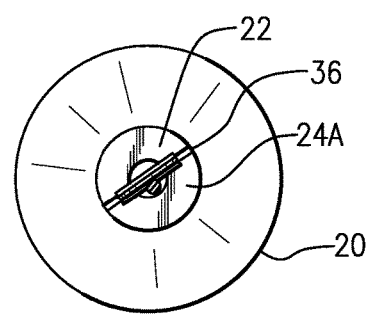
FIG. 6 is a top plan view thereof.

In this embodiment the assortment of regulator disks 24 includes six disks, each with a center aperture 38 of a respective diameter. The user selects the one of the disks appropriate for the type of bird feed or other food, and this example the user selects disk 24A. The regulator disk 24A is positioned at the apex of the feed funnel 20 upon an annular ledge 42 (see FIG. 1), and the trigger rod or trigger bar 26 is placed through the aperture 38 of the disk 24A as shown in FIGS. 4, 5, and 6.

As illustrated, the trigger bar 22 has an elongated down-rod 30 with a cross bar 32 affixed to it near its upper end. A spade or paddle 34 is affixed to the rod 30 and cross bar 32 and extends upward from the cross bar 32. As seen in these views, each of the regulator disks 24 has a transverse groove or channel configured to serve as a seat for the cross bar 32 to keep the trigger bar 22 approximately centered on the aperture 38 of the regulator disk.

The spade or paddle 34 bears against the feed once the hopper and feed funnel 20 are filled with the feed. When feeding action of the bird or birds causes a swinging movement of the down-rod 30, the spade 34 acts to disrupt the fill of seeds and other particle in the vicinity of the aperture 38, causing some of the feed particles to fall through the aperture 38 and the feed dispensing tube and down onto the catch dish 26, which then serves as a feed tray for the birds.

The catch dish 26 is positioned along the rod 30 at an optimal height above the floor surface and beneath the bucket 12 for the bird or birds to reach and peck at the feed. Initially, the user may place a small amount of feed onto the dish 26 to induce the birds to peck at it. Once the birds begin to feed, the pecking action against the catch dish 26 will cause the trigger bar 22 to move, and the action of the spade or paddle 34 will cause an additional amount of feed to drop from the hopper onto the feed dish.

Figure 7:
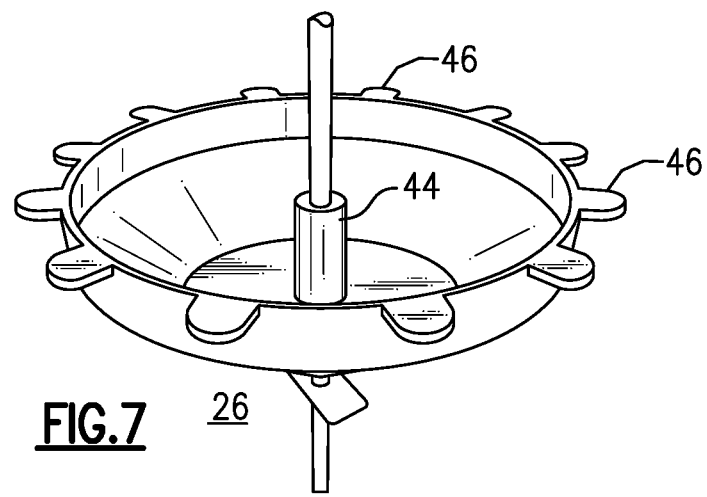
FIGS. 7 and 8 are a perspective view and side elevation of the catch dish of this embodiment of the invention.
Figure 8:
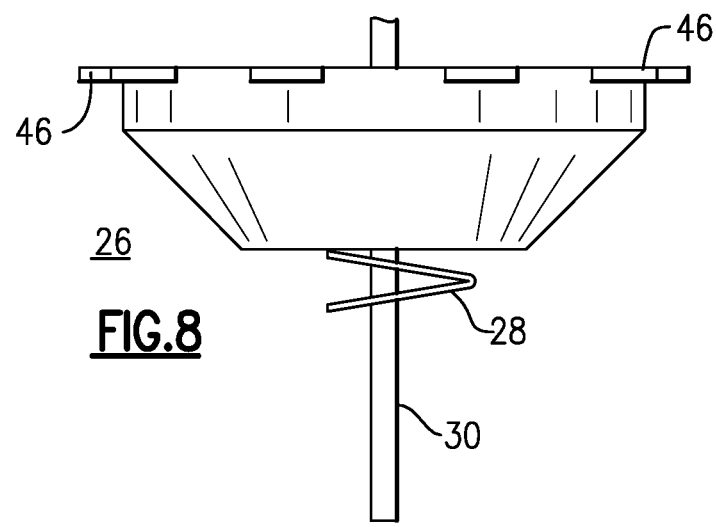

As shown in FIGS. 7 and 8, a preferred design for the feed dish 26 has a somewhat frustoconic shape with a flat center part and sloping sides, here with a hollow vertical center tube 44 that fits over the down rod 30 of the trigger bar and allows the dish 26 to be moved up or down, and then locked in place with the spring lock 28. At the upper rim of the feed dish 26 there are rounded tabs or petals 46 that extend radially out and which the necks of the birds engage when feeding to assist in rocking of the trigger bar down rod 30 and spade 34.

Any suitable round pail can be used as the hopper for this system, and can be prepared by drilling or cutting out a four-inch center opening at the bottom center of the pail. The feeder funnel 20 is simply inserted into the pail and urged down until the rim of the feeder funnel is against the inner surface of the wall of the pail. Based on the type of feed that is intended to be dispensed, the one of the several regulator disks appropriate for that feed type is selected and positioned in the feeder funnel.

The pail can be securely hung using the pail hanger 16, or can be supported on a pail stand or wall mounting bracket, as desired. Favorably the bottom of the pail 12 should be about fourteen inches above floor level. The tube end of the feeder funnel will then protrude out the bottom of the pail. With the regulator disk 24 in place on the ledge 42 of the funnel opening, the long down-rod 30 of the trigger bar 22 is inserted through the aperture 38 and the cross bar 32 is positioned so as to seat in the transverse groove 36, i.e., centered in the aperture 38.

The catch dish 26 is inserted with the vertical center post 44 over the down rod 30 and the dish 26 is locked in place at the desired height, by pressing together the ends of the spring lock 28, and passing the down rod 30 through the holes and then releasing it when under the dish 26.

The feeder can be tested by placing a small amount of feed, e.g., about two cups, into the pail, while ensuring that the trigger bar 22 remains centered on the regulator disk. Wiggling the catch dish 26 will cause the trigger bar to oscillate and a small amount of feed should then drop into the catch dish 26. The regulator disk can be changed to one with a larger or smaller aperture 38 to increase or decrease the quantity of released feed.

Any of a wide variety of feeds can be dispensed, including pellets, crumble, fish feed, cat feed, dog feed, or grains such as corn, cracked corn, wheat, oats, milo, millet, safflower seed, peas, vetch, barley, buckwheat, canary seed, or flax, selecting the appropriate regulator disk to regulate the amount of released feed and the level of bird usage physical activity.

In this embodiment, the trigger bar 22 is of sturdy steel construction, but a durable plastic resin could be used for this part, if desired.

The invention has been described herein with reference to a single preferred embodiment, but the invention is not limited to that embodiment. Rather, many modifications and variations will become apparent to persons skilled in the art without departing from the scope and spirit of this invention, as defined in the appended claims.

What is claimed is:

1. Self-dispensing feeder for poultry and small animals that is adapted for being suspended above a floor surface to permit one or more birds to feed from a catch dish that is suspended above the floor surface and into which feed particles are permitted to fall as a result of the one or more birds or animals feeding from the catch dish; the poultry feeder comprising:
   a hopper suspended or supported at an elevated position above said floor surface and adapted to hold a fill of said particles of feed, and including a generally conic feed funnel therein, the feed funnel having a dispensing tube at a lower apex end thereof and having an open lower end and a ledge at an upper end thereof;
   a metering plate supported on said ledge and having a central aperture therein and a transverse slot that extends on either side of said central aperture;
   a trigger rod extending downward through said central aperture of said metering plate and continuing down through said dispensing tube and out the lower end of said dispensing tube; including a cross bar extending horizontally and resting on said metering plate and seated in said transverse slot, and a spade affixed onto said trigger rod above said metering plate and extending upward above said cross bar, the spade being configured to bear against the feed particles within said feed funnel; and
   wherein said catch dish is held and positioned on said trigger rod at a selected position above said floor surface and beneath said hopper.

2. Self-dispensing poultry feeder according to claim 1 wherein said catch dish is slideable along said trigger rod, and further including a catch dish lock that is adjustably positionable on said trigger bar to retain the catch dish at the selected position above the floor surface and beneath said hopper.

3. Self-dispensing poultry feeder according to claim 1, further comprising a plurality of metering plates each with a respective center aperture, with the center apertures of the metering plates being of different respective diameters.

4. Self-dispensing poultry feeder according to claim 1, wherein said hopper includes a round plastic resin pail with a bail handle and having an opening in the bottom of said pail to admit the feed funnel dispensing tube to pass through.

* * * * *